UNITED STATES PATENT OFFICE.

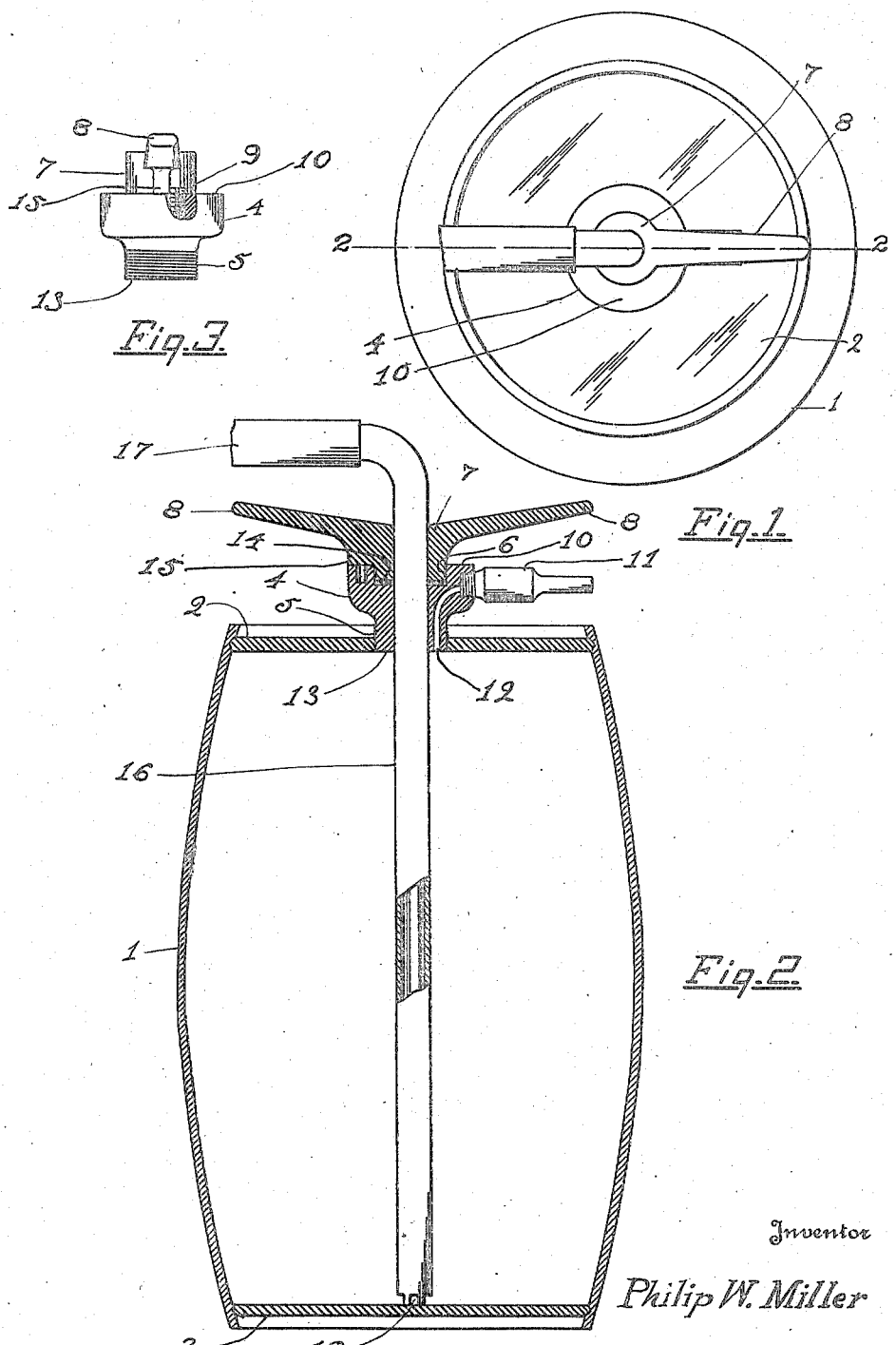
P. W. MILLER.
BARREL EMPTYING APPARATUS.
APPLICATION FILED MAR. 9, 1918.
1,325,796.
Patented Dec. 23, 1919.
Inventor
Philip W. Miller

PHILIP W. MILLER, OF KANSAS CITY, MISSOURI.

BARREL-EMPTYING APPARATUS.

1,325,796. Specification of Letters Patent. Patented Dec. 23, 1919.

Application filed March 9, 1918. Serial No. 221,551.

*To all whom it may concern:*

Be it known that I, PHILIP W. MILLER, a citizen of the United States, residing at Kansas City, in the county of Jackson and State of Missouri, have invented certain new and useful Improvements in Barrel-Emptying Apparatus, of which the following is a full, clear, and exact description, such as will enable others skilled in the art to which it appertains to make and use the same.

The invention relates to barrel emptying apparatus and seeks to provide a simple and efficient apparatus that can easily and quickly be connected to a barrel, tank and the like so that compressed air can be connected thereto and the barrel or tank emptied.

It is not new to empty barrels and tanks by compressed air pressure, but by reducing the number of parts of the apparatus and simplifying the construction a more satisfactory apparatus is attained and at a lower cost, so that compressed air will be more generally employed for emptying barrels and tanks.

The present invention seeks to provide an improved apparatus with few and simply constructed parts for emptying barrels, tanks and the like of liquid by the admission of compressed air.

With these and other objects in view the invention consists in the improved construction, combinations and arrangements of parts hereinafter set forth and more particularly pointed out in the appended claim, the accompanying drawings illustrating the improved apparatus.

In the drawings:

Figure 1 is a plan view of the improved apparatus attached to a barrel.

Fig. 2 is a sectional view on line 2—2 of Fig. 1.

Fig. 3 is a view in elevation of certain parts of the apparatus, broken open to illustrate a certain screw. The barrel shown comprises the usual staves 1, upper head 2, and lower head 3, which are of common and well known construction.

The sleeve 4 is provided with the external thread 5 to connect with the barrel, the internal thread 6 to receive the packing nut 7 which is integral with the handles 8, the stop screw 9, projecting above the face 10 of the sleeve, has the hose connecting nipple 11 screw-threaded therein and the hole 12 connecting from the nipple 11 to the lower face 13 of the sleeve.

The packing nut 7 is fitted to the threads 6 of the sleeve 4 and screwed therein upon the packing 14, and is provided with the extending lip 15 to engage the screw 9, this screw being inserted in the sleeve after the packing nut is screwed down tight upon the packing, the purpose of the screw being to prevent the packing nut from turning out of the sleeve when removing the apparatus from the barrel. It will be understood that the sleeve 4 can be turned tightly into the barrel by the handles 8 of the packing nut 7.

Fitting within the sleeve 4 and packing nut 7 and packed tight against leakage by the packing 14, is the pipe 16 extending above the packing nut 7 and provided with the connecting hose 17, and projecting downwardly into the barrel to the lower head 3, the notches 18 being provided so that the liquid in the barrel can enter the pipe when it is resting against the head 3.

The pipe 16 is inserted in the barrel as shown and the sleeve 4 turned tightly into the threads 6, an air hose connected to the nipple 11 and air admitted to the barrel through the hole 12, as air is lighter than liquid it will remain above the latter and force it out of the barrel through the pipe 16 and hose 17.

What I claim as new, and desire to secure by Letters Patent, is:—

In barrel emptying apparatus, a sleeve, an external thread on one end of said sleeve, an internal thread in the opposite end of said sleeve, a packing nut in said internal thread, handles integral with said packing nut, a nipple for air connections in one side of said sleeve, a hole connecting from said nipple to the inner end of said sleeve, a lip extending radially from said packing nut, a screw in said sleeve to engage said lip and prevent said packing nut from turning out of said sleeve while removing said sleeve from the barrel, and a pipe in said sleeve and said packing nut.

PHILIP W. MILLER.